US008657329B2

(12) United States Patent
Fujiwara et al.

(10) Patent No.: US 8,657,329 B2
(45) Date of Patent: Feb. 25, 2014

(54) INSTRUMENT PANEL MODULE

(75) Inventors: Yusuke Fujiwara, Okazaki (JP); Osamu Fukawatase, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/810,752

(22) PCT Filed: Apr. 11, 2011

(86) PCT No.: PCT/JP2011/059036
§ 371 (c)(1),
(2), (4) Date: Jan. 17, 2013

(87) PCT Pub. No.: WO2012/140724
PCT Pub. Date: Oct. 18, 2012

(65) Prior Publication Data
US 2014/0021702 A1      Jan. 23, 2014

(51) Int. Cl.
*B60R 21/205* (2011.01)
*B60R 21/215* (2011.01)
(52) U.S. Cl.
USPC ....................................... 280/728.3; 280/732
(58) Field of Classification Search
USPC ............................................. 280/728.3, 732
See application file for complete search history.

(56) References Cited

U.S. PATENT DOCUMENTS

| 5,630,613 A | 5/1997 | Leonard et al. |
| 5,941,558 A * | 8/1999 | Labrie et al. ............... 280/728.3 |
| 6,322,101 B1 | 11/2001 | Suizu et al. |
| 2013/0187365 A1* | 7/2013 | Fujiwara et al. ........... 280/728.3 |

FOREIGN PATENT DOCUMENTS

| JP | U-3037101 | 5/1997 |
| JP | B2-2998745 | 1/2000 |
| JP | A-2003-285707 | 10/2003 |
| JP | A-2008-44577 | 2/2008 |
| JP | A-2008-62808 | 3/2008 |
| JP | A-2010-076583 | 4/2010 |

* cited by examiner

*Primary Examiner* — Drew Brown
(74) *Attorney, Agent, or Firm* — Oliff PLC

(57) ABSTRACT

A decorative panel is suppressed from coming off during airbag inflation and deployment. In an instrument panel module 10, an opening section 32 formed in a frame section 28 of the retainer 22 is closed off by the door main body section 52A of the airbag door 52, and the door adjacent portion 62 formed in a decorative panel 60 adjacent at the vehicle bottom side of the door main body section 52A. A main body portion 62A of a door adjacent portion 62 is joined to a joining section 70 formed at an upper portion of a hinge member 68, such that the door adjacent portion 62 is supported by the hinge member 68 so as to be capable of opening towards the vehicle bottom side. First fixing portions 72 are formed to the lower portion of the hinge member 68, and the first fixing portions 72 are fixed to a top edge portion 78A of the opening section 78 of a glove box 76 provided to the instrument panel base member 12.

12 Claims, 6 Drawing Sheets

INSTRUMENT PANEL MODULE

TECHNICAL FIELD

The present invention relates to an instrument panel module.

BACKGROUND ART

Decorative panels are known that are provided with: projecting sections having leading portions that engage with engaging holes formed to an instrument panel in a state projecting out from the back-face side of the instrument panel; and a main body section integrally formed with the projecting sections, and attached to the instrument panel by the projecting sections engaging with the engaging holes (for example, refer to Japanese Patent Laid-Open (JP-A) No. 2008-44577).

DISCLOSURE OF INVENTION

Technical Problem

However, there is the concern that when a portion of decorative panels of this type is provided to an airbag door, and leading end portions of the projecting sections formed to this portion of the decorative panel extend out from the rear-face side of the airbag door, the decorative panel may become detached due to the airbag pressing against the leading end portions of the projecting sections during airbag inflation and deployment.

In consideration of the above circumstances, an object of the present invention is to provide an instrument panel module that is able to suppress detachment of the decorative panel during airbag inflation and deployment.

Solution to Problem

In order to address the above problem, an instrument panel module of a first aspect of the present invention includes: an instrument panel base member provided at a front section of a vehicle compartment; a retainer that is joined to a back-face side of the instrument panel base member and that includes a frame section formed with an opening section that opens towards a front-face side of the instrument panel base member; an airbag unit including an airbag that is housed in a folded state inside the frame section and that inflates and deploys to the front-face side of the instrument panel base member when supplied with gas; an airbag door formed at the instrument panel base member, including a door main body section that closes off a first portion of the opening section and that is capable of opening either to a vehicle top side or a vehicle bottom side; a decorative panel including a door adjacent portion that is adjacent to the door main body section in a vehicle top-bottom direction, a portion of the door adjacent portion at a door main body section side closing off a remaining portion of the opening section, and a portion of the door adjacent portion at an opposite side to the door main body section being positioned further toward the opposite side to the door main body section than the opening section; and a hinge member that is joined to the portion of the door adjacent portion at the opposite side to the door main body section, that is fixed to the instrument panel base member, and that supports the door adjacent portion so as to enable the door adjacent portion to open in an opposite direction to an opening direction of the airbag door.

In such an instrument panel module, the first portion of the opening section formed to the frame section of the retainer is closed off by the door main body section of the airbag door. The decorative panel is formed with a door adjacent portion that is adjacent to the door main body section in the vehicle top-bottom direction, and the remaining portion of the opening section is closed off by the portion of the door adjacent portion on the door main body side. The portion of the door adjacent portion on the opposite side to that of the door main body section is also joined to the hinge member, and is supported by the hinge member so as to be capable of opening. When the airbag is supplied with gas and inflates, the portion of the door adjacent portion on the door main body section side, as well as the door main body section are pressed by the airbag, and the door adjacent portion is opened together with the airbag door.

The door adjacent portion is fixed via the hinge member to the instrument panel base member. The door adjacent portion, and therefore the whole of the decorative panel, can accordingly be suppressed from coming away when the door adjacent portion opens and the airbag is inflated and deployed as described above.

However, the portion of the door adjacent portion on the opposite side to that of the main body portion that is the joining portion to the hinge member is positioned further to the opposite side to that of the door main body section than the opening section formed in the frame section of the retainer. Interference can accordingly be avoided between the portion of the door adjacent portion on the opposite side to that of the door main body section and the airbag even when the airbag is inflated towards the front-face side of the instrument panel base member through the opening section. In this way, the door adjacent portion, and therefore the whole of the decorative panel, can accordingly be suppressed from coming off when the airbag is inflated and deployed.

In an instrument panel module according to a second aspect of the present invention, the hinge member includes a fixing portion that is fixed to the instrument panel base member by a screw or a clip at a portion of the hinge member at an opposite side thereof to the door main body section; and the instrument panel module further includes a glove box door provided, so as to be capable of opening, at a position at the opposite side of the decorative panel to the door main body section, with the glove box door covering the fixing portion from the instrument panel base member front-face side when the glove box door is closed.

According to such an instrument panel module, in the state in which the glove box door is closed, the fixing portion of the hinge member to the instrument panel base member is covered by the glove box door from the front-face side of the instrument panel base member. Good design can accordingly be secured for the peripheral portions of the decorative panel and the glove box door.

However, in the opened state of the glove box, or in a state prior to attaching the glove box door to the instrument panel base member, the hinge member can be attached to the instrument panel base member by fixing the fixing portions to the instrument panel base member using screws or clips. There is accordingly good attachment capability to the instrument panel base member, and few modifications are required to be made to an instrument panel module not already configured with the hinge member and the decorative panel. Assembly of the instrument panel module configured with the hinge member and the decorative panel can accordingly easily be made using assembly processes employed for assembling an instrument panel module not configured with the hinge member and the decorative panel.

In an instrument panel module according to a third aspect of the present invention, the hinge member includes a first fixing portion as the fixing portion; the decorative panel includes second fixing portions disposed at portions further toward both vehicle width direction sides than the door adjacent portion, the second fixing portions being fixed to the instrument panel base member at portions of the decorative panel at a glove box door side by screws or clips; and the glove box door is configured so as to cover the first fixing portion and the second fixing portions from the instrument panel base member front-face side when the glove box door is closed.

According to such an instrument panel module, in the state in which the glove box door is closed, the first fixing portion of the hinge member to the instrument panel base member and the second fixing portions of the decorative panel to the instrument panel base member are covered by the glove box door from the instrument panel base member front-face side. Good design can accordingly be further secured for the peripheral portions of the decorative panel and the glove box door.

It is possible to fix the second fixing portions to the instrument panel base member with similar ease to the first fixing portion. Accordingly, even in cases where the second fixing portions are included in addition to the first fixing portions, assembly of the instrument panel module configured with the hinge member and the decorative panel can accordingly easily be made using assembly processes employed for assembling an instrument panel module not configured with the hinge member and the decorative panel.

In an instrument panel module according to a fourth aspect of the present invention, an assembly direction of the screws or clips fixing the first fixing portion and the second fixing portions to the instrument panel base member, and an assembly direction of the glove box door to the instrument panel base member are matching directions.

According to such an instrument panel module, the assembly direction to the instrument panel base member of the screws or clips for fixing the first fixing portion and the second fixing portions, and the assembly direction of the glove box door to the instrument panel base member are matching directions. Productivity during assembling the decorative panel and the hinge member to the glove box door and the instrument panel base member can accordingly be enhanced.

In an instrument panel module of a fifth aspect of the present invention, the decorative panel is formed with vertical tear line portions that extend along the vehicle top-bottom direction at both the vehicle width direction sides of the door adjacent portion.

According to such an instrument panel module, the decorative panel is formed with the vertical tear line portions that extend respectively along the vehicle top-bottom direction at the two vehicle width direction sides of the door adjacent portion. Cracks can accordingly be induced in the decorative panel along the vertical tear line portions when the portion of the door adjacent portion on the door main body side is pressed by the airbag as described above. The door adjacent portion can accordingly be smoothly separated from portions at its two sides, and delay in opening the door adjacent portion, and therefore delay in inflating and deploying the airbag, can be suppressed.

In an instrument panel module according to a sixth aspect of the present invention, an extension portion is formed at the airbag door further toward a door adjacent portion side than the door main body section, and the extension portion is positioned at a vehicle rear side with respect to the portion of the door adjacent portion at the door main body section side and overlapping, in the vehicle top-bottom direction, the portion of the door adjacent portion at the door main body section side.

According to such an instrument panel module, the extension portion is formed to the airbag door further to the door adjacent portion side than the door main body section, and the extension portion is positioned on the vehicle rear side with respect to the portion of the door adjacent portion on the door main body section side and overlapping along the vehicle top-bottom direction with the portion of the door adjacent portion on the door main body section side. Consequently, except for during inflation of the airbag, even when external force acts on the door adjacent portion in the opening direction, the portion of the door adjacent portion on the door main body side catches on the extension portion, enabling opening of the door adjacent portion to be suppressed and the decorative panel to be suppressed from coming off.

The extension portion is also supported by the portion of the door adjacent portion on the door main body side even when a pressing force acts on the extension portion from the front-face side of the airbag door. The extension portion can accordingly be suppressed from being deformed by being pressed.

In an instrument panel module of a seventh aspect of the present invention, a facing portion is formed at the instrument panel base member, and the facing portion faces, in a vehicle front-rear direction, a joining portion of the hinge member to the door adjacent portion.

According to such an instrument panel module, the joining portion of the hinge member to the door adjacent portion faces the facing portion formed to the instrument panel base member in the vehicle front-rear direction. The joining portion of the hinge member to the door adjacent portion is accordingly supported by the facing portion even when pressing force acts on the joining portion of the hinge member to the door adjacent portion through the door adjacent portion from the front-face side of the door adjacent portion. Deformation due to pressing the door adjacent portion can accordingly be suppressed.

In an instrument panel module according to an eighth aspect of the present invention the joining portion is separated from the facing portion in the vehicle front-rear direction.

According to such an instrument panel module, the joining portion of the hinge member to the door adjacent portion is separated from the facing portion in the vehicle front-rear direction. Hence even if there is some variation across the vehicle width direction in the positioning precision of the joining section and/or the facing portion in the vehicle front-rear direction, such variation in positioning precision can be absorbed in the gap between the joining section and the facing portion. Precise positioning in the vehicle front-rear direction of the door adjacent portion with respect to the airbag door can accordingly be secured.

In an instrument panel module of a ninth aspect of the present invention, a nipped portion is formed at one end portion of adjacent ends of the door main body section or the door adjacent portion; and a nipping portion is formed at the other end portion of the adjacent ends of the door main body section or the door adjacent portion, and the nipping portion nips the nipped portion from the instrument panel base member front-face side and back-face side.

According to such an instrument panel module, the nipped portion formed to an end portion on either the door main body section side or the door adjacent portion side is nipped by the nipping portion formed to an end portion on the other side out of the door main body section or the door adjacent portion from the instrument panel base member front-face side and back-face side. Accordingly, even if, for example, impact force is imparted from the instrument panel base member front-face side to the door main body section and the door adjacent portion, the end portions of the door main body section and the door adjacent portion can be suppressed from deformation towards the instrument panel base member back-face side. A reaction force can accordingly be generated by the door main body section and the door adjacent portion.

In an instrument panel module of a tenth aspect of the present invention, a face of the nipped portion positioned at the instrument panel base member front-face side is a curved face forming a shape that is convex towards the vehicle top side.

According to such an instrument panel module, a face of the nipped portion described above positioned at the instrument panel base member front-face side is a curved face forming a shape that is convex towards the vehicle top side. Accordingly, even when during airbag inflation the airbag door and the door adjacent portion open due to pressure from the airbag, the curved face slides smoothly against the nipping portion, and so the connection between the nipped portion and the nipping portion can be smoothly released.

In an instrument panel module of an eleventh aspect of the present invention, the nipped portion is formed so as to become thinner towards a leading end thereof.

According to such an instrument panel module, it is possible for the nipped portion to be easily connected (inserted into) to the nipping portion during assembly of the decorative panel, due to the nipped portion being formed such that its thickness gets thinner on progression towards its leading end.

In an instrument panel module of a twelfth aspect of the present invention, the retainer is disposed at a portion in front of a front passenger seat; and the opening section is positioned between an upper portion of the instrument panel base member and the glove box door that is provided at a lower portion of the instrument panel base member.

According to such an instrument panel module, the airbag unit is provided between the upper section and the lower section of the instrument panel base member, in what is referred to as a mid-mounted structure. The airbag can accordingly be deployed from a position closer to the front seat passenger than in what is referred to as a top-mounted airbag with an airbag unit provided to the upper section of the instrument panel base member. The restraining ability to a front-seat passenger can accordingly be enhanced.

Advantageous Effects of Invention

As explained in detail above, the present invention is capable of suppressing the decorative panel from detaching during deployment and inflation of an airbag.

DESCRIPTION OF EMBODIMENTS

Explanation follows regarding a first exemplary embodiment of the present invention, with reference to the drawings.

In each of the drawings the arrow UP, the arrow FR and the arrow RH indicate respectively the vehicle top-bottom direction top side, the vehicle front-rear direction front side, and the vehicle width direction right hand side.

Figure 1:
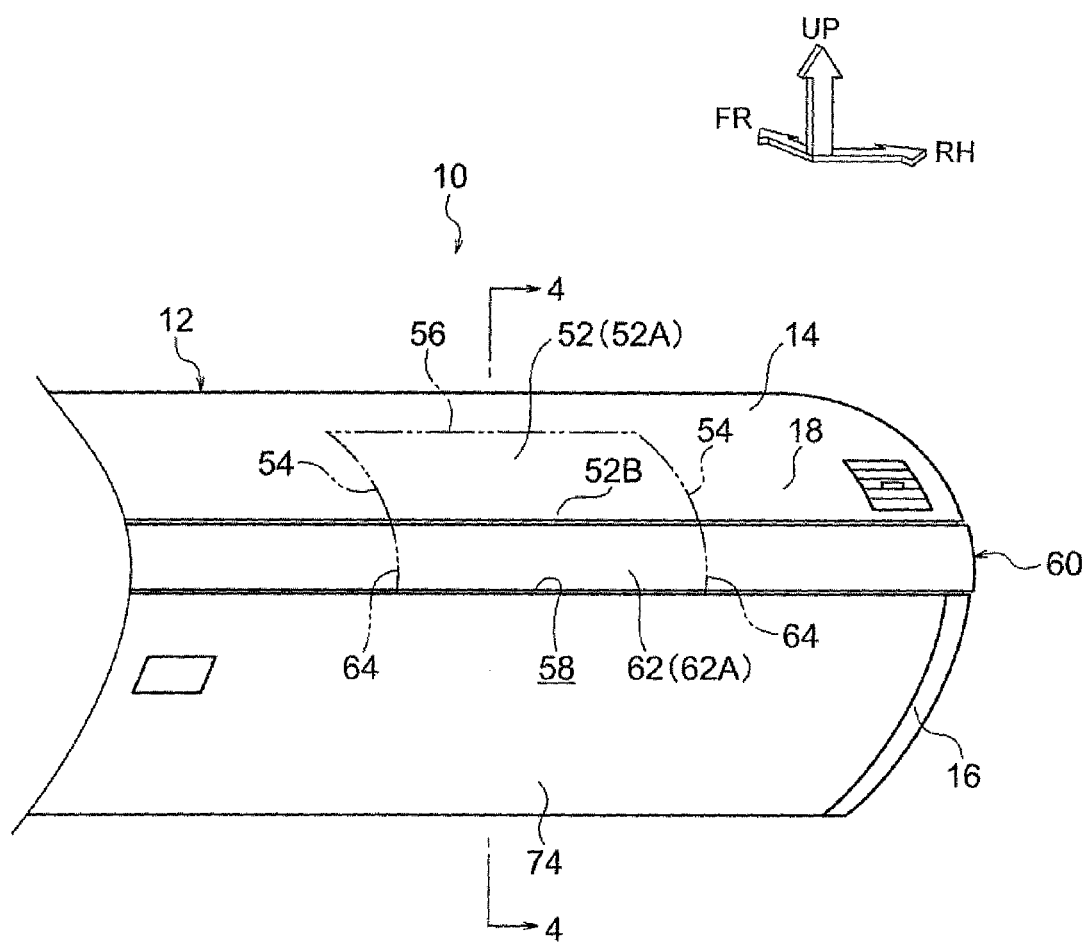
FIG. 1 is a perspective view illustrating a passenger seat side portion of an instrument panel module according to a first exemplary embodiment of the present invention.

As shown in FIG. 1, an instrument panel module 10 according to a first exemplary embodiment of the present invention is provided with an instrument panel base member 12. The instrument panel base member 12 is made from a resin and is provided so as to extend along the vehicle width direction at a front section of a vehicle compartment. At a portion of the instrument panel base member 12 in front of a front passenger seat, not shown in the drawings, a top-bottom direction intermediate section 18 is formed between an upper section 14 facing towards the vehicle top side, and a lower section 16 to which a glove box door 74 is provided, described later. The top-bottom direction intermediate section 18 is curved so as to form a shape that is convex towards the vehicle rear side and the vehicle top side.

Figure 4:
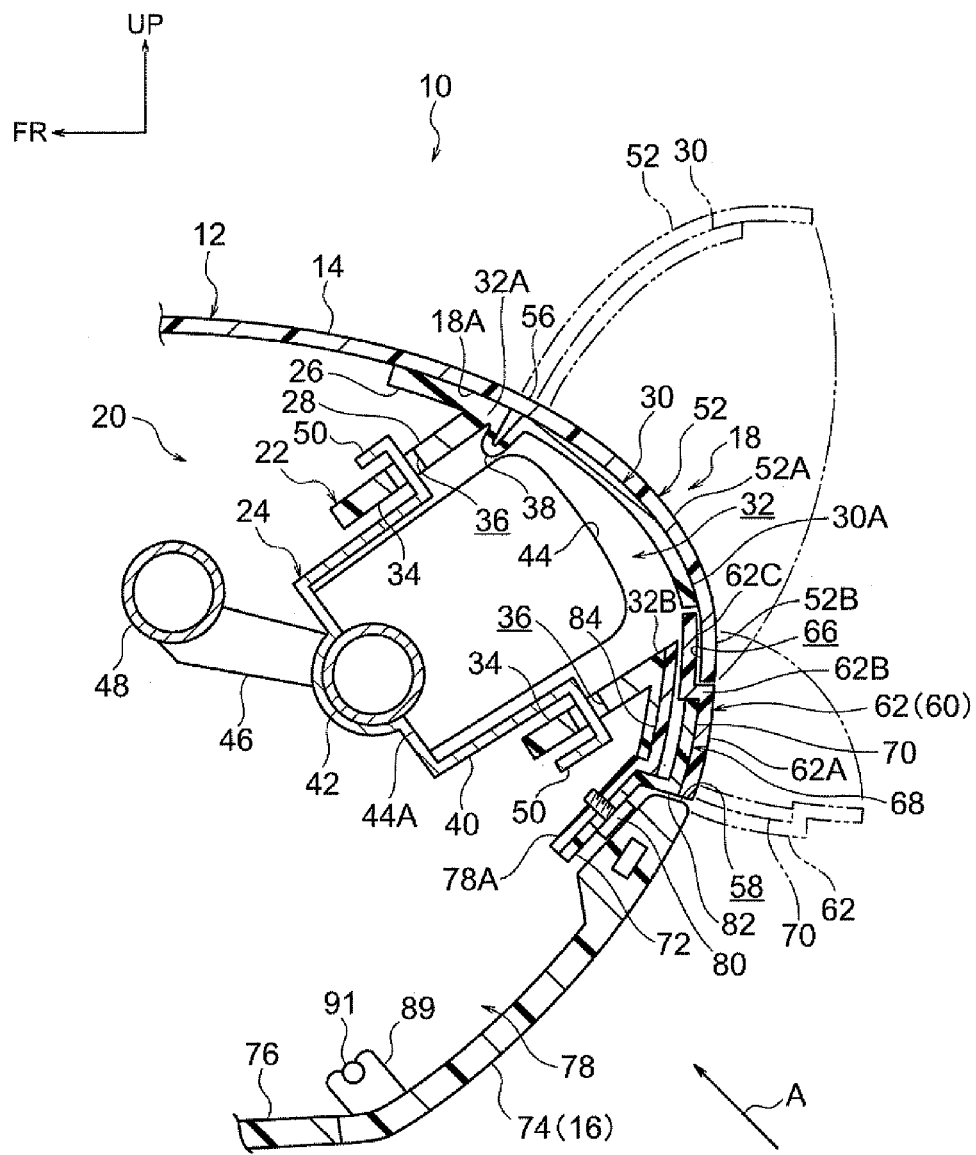
FIG. 4 is an enlarged cross-section taken along the line 4-4 in FIG. 1.

A front passenger seat airbag device 20 is provided at the back-face side of the top-bottom direction intermediate section 18, as shown in FIG. 4. The front passenger seat airbag device 20 is what is referred to as a mid-mounted airbag device, disposed between the upper section 14 and the lower section 16 and provided with a retainer 22 and an airbag unit 24.

The retainer 22 is configured with a flange section 26, a frame section 28 and a door reinforcement section 30. The flange section 26 is configured in a ring shape around the periphery of the frame section 28 and is joined to a back-face 18A of the top-bottom direction intermediate section 18, by welding for example.

The frame section 28 is formed on the top-bottom direction intermediate section 18 side with an opening section 32 having an axial direction extending along the front-face back-face direction of the top-bottom direction intermediate section 18, and opening towards the front-face side of the top-bottom direction intermediate section 18 (the vehicle rear side and top side). The opening section 32 is formed with a rectangular shaped cross-section, and is positioned between the upper section 14 and the glove box door 74. Engaging holes 36 are respectively formed in a pair of vehicle top-bottom direction facing side wall sections 34 of the frame section 28 so as to pass through the side wall sections 34 in the thickness direction.

The door reinforcement section 30 is coupled to a vehicle top side edge portion 32A of the opening section 32 through a U-shaped cross-section hinge section 38. The door reinforcement section 30 is formed in a plate shape extending towards a vehicle bottom side edge portion 32B of the opening section 32. A bottom edge portion 30A of the door reinforcement section 30 has an edge that finishes at a position further towards the vehicle top side than the lower portion of the opening section 32.

The airbag unit 24 includes a case 40, an inflator 42 and an airbag 44. The case 40 is provided at the inside of the frame section 28 and is fixed to instrument panel reinforcement 48 through a bracket 46. A box shaped opening is formed to the case 40 facing towards the top-bottom direction intermediate section 18 front-face side. The case 40 is formed with a pair of engaging tabs 50 that extend towards the side wall section 34 sides. The pair of engaging tabs 50 engage with the engaging holes 36.

An inflator 42 is a tube shaped cylinder type inflator. The inflator 42 is disposed with its axial direction along the vehicle width direction, and is fixed to the lower portion of the case 40. When the inflator 42 is input with a signal output from a control device, not shown in the drawings, the inflator 42 supplies gas into the airbag 44 so as to inflate and deploy the airbag 44.

The not-illustrated control device outputs a signal to the inflator 42 when it has been detected that a frontal collision of the vehicle has actually occurred or when it has been predicted that the vehicle will be involved in a frontal collision. The airbag 44 is housed in a folded state inside the case 40, with a base end portion 44A of the airbag 44 fixed to the lower portion of the case 40.

An airbag door 52 is formed to the location of the top-bottom direction intermediate section 18 where the front passenger seat airbag device 20 is provided. A door main body section 52A is configured by portions of the airbag door 52 that overlap with the door reinforcement section 30. The door main body section 52A is joined to the door reinforcement section 30, for example by welding, so as to combine with the door reinforcement section 30 to close off the portion further to the vehicle top side than the lower portion of the opening section 32.

An extension portion 52B is formed in the airbag door 52 further to the vehicle bottom side than the door main body section 52A (on the side of the door adjacent portion 62, described later) so as to extend out to the vehicle bottom side with respect to the door reinforcement section 30.

The door main body section 52A corresponds to a door main body section of an airbag door of the present invention. Note that it is also possible for the door reinforcement section 30 to serve as the door main body section of the airbag door of the present invention, in place of the airbag door 52. It is also possible for the door reinforcement section 30 and the door main body section 52A to serve as the door main body section of the airbag door of the present invention.

As shown in FIG. 1, a pair of vertical rupture prepared portions 54 that extend in the vehicle top-bottom direction are formed at the edge portions of the airbag door 52 at both vehicle width direction sides. A hinge section 56 is formed in the instrument panel base member 12 at a portion connecting together the vehicle top side end portions of the pair of vertical rupture prepared portions 54, supporting the airbag door 52 so as to enable opening towards the vehicle top side.

The hinge section 56 is, as shown in FIG. 4, set at a position corresponding in both the vehicle top-bottom direction and the vehicle front-rear direction to the position of the hinge section 38 formed in the retainer 22. The hinge section 56 may be configured by forming a groove portion of reduced thickness extending along the vehicle width direction on the back-face side of the hinge section 56.

As shown in FIG. 1, a recessed portion 58 is formed in the instrument panel base member 12 between the airbag door 52 and the glove box door 74. The recessed portion 58 opens towards the vehicle rear side and extends along the vehicle width direction. A decorative panel 60 is housed in the recessed portion 58.

The decorative panel 60 is formed in an elongated shape extending along the vehicle width direction of the airbag door 52. A portion of the decorative panel 60 that overlaps with the door main body section 52A in the vehicle width direction, namely a central portion of the decorative panel 60, configures a door adjacent portion 62 that is adjacent to the door main body section 52A in the vehicle top-bottom direction.

A vertical tear line portion 64 is formed in the decorative panel 60 so as to extend along the vehicle top-bottom direction at each of the vehicle width direction sides of the door adjacent portion 62. The vertical tearing portions 64 are formed as rows along the vehicle top-bottom direction so as to form straight lines with the vertical rupture prepared portions 54. The vertical tearing portions 64 and the vertical rupture prepared portions 54 are formed along vehicle width direction edge portions at both sides of the opening section 32 of rectangular shaped cross-section (see FIG. 4).

The door adjacent portion 62, as shown in FIG. 4, includes a main body portion 62A that is in the same plane as the airbag door 52 (the extension portion 52B), and an upper portion 62C that is connected to the vehicle top side edge of the main body portion 62A through a stepped portion 62B. The main body portion 62A is positioned further to the opposite side to the opening section 32 than to the door main body section 52A side, namely on the vehicle bottom side.

The upper portion 62C is positioned on the vehicle front side with respect to the main body portion 62A. The upper portion 62C extends along the extension portion 52B of the airbag door 52 towards the vehicle top side through a slit 66 extending along the vehicle width direction. The leading end of the upper portion 62C projects out towards the vehicle top side with respect to the edge portion 3213 at the vehicle bottom side of the opening section 32. The upper portion 62C thereby closes off the lower portion of the opening section 32.

The extension portion 52B is positioned to the vehicle rear side with respect to the upper portion 62C and overlaps in the vehicle top-bottom direction with the upper portion 62C. The upper portion 62C is also aligned to face towards a bottom edge portion 30A of the door reinforcement section 30 along the vehicle top-bottom direction.

A portion that is further to the vehicle top side than the lower portion of the opening section 32 and is closed off by the door reinforcement section 30 and the door main body section 52A corresponds to the first portion of the opening section of the present invention, and the lower portion of the opening section 32 that is closed off by the upper portion 62C of the door adjacent portion 62 corresponds to the remaining portion of the opening section of the present invention. The upper portion 62C corresponds to the portion on the door main body section side of the door adjacent portion of the present invention. The main body portion 62A corresponds to the portion of the door adjacent portion on the opposite side to that of the door main body section of the present invention.

As shown in FIG. 4, the hinge member 68 is provided at the vehicle front side of the door adjacent portion 62. The hinge member 68 is formed with substantially the same length in the vehicle width direction to that of the door adjacent portion 62. A joining section 70 is formed to an upper portion of the hinge member 68, and the joining section 70 is joined to the back-face side of the main body portion 62A, such as by welding or bonding.

Figure 3:
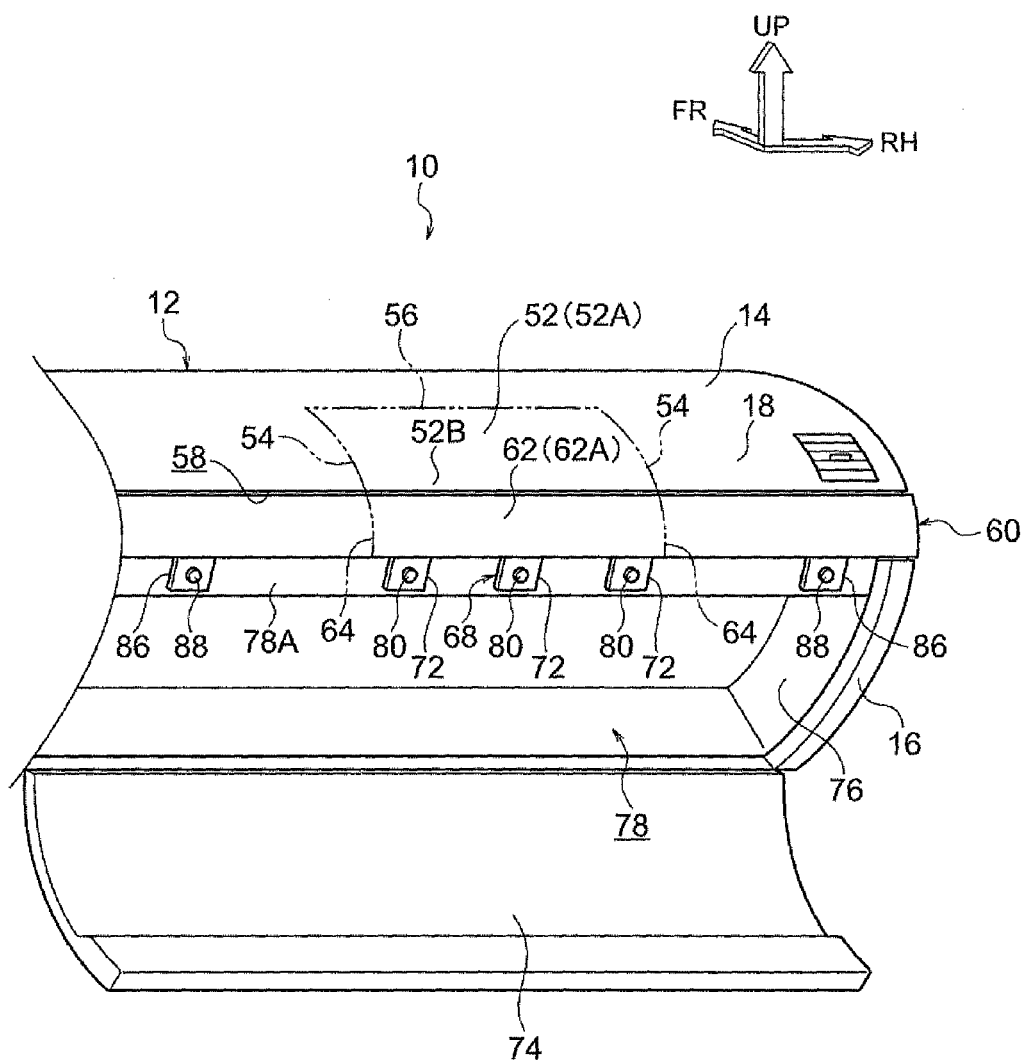
FIG. 3 is a perspective view illustrating a glove box door of the instrument panel shown in FIG. 1 in an open state.

First fixing portions 72 are formed as fixing portions to the portion of the hinge member 68 on the opposite side to that of the door main body section 52A, namely the lower portion of the hinge member 68. Plural of the first fixing portions 72 are, as shown in FIG. 3, formed at intervals along the vehicle width direction. The plural first fixing portions 72 are fixed with screws 80 to a top edge portion 78A of an opening section 78 formed in a glove box 76 that is opened or closed by the glove box door 74.

As shown in FIG. 4, the portions of the hinge member 68 between the joining section 70 and the first fixing portions 72 configure a hinge section 82. The door adjacent portion 62 is supported by the hinge member 68 provided with the hinge section 82, so as to enable the door adjacent portion 62 to open towards the vehicle bottom side, this being the opposite side to that of the opening direction of the airbag door 52.

A facing portion 84 is formed to the instrument panel base member 12 at the vehicle top side of the top edge portion 78A, and the joining section 70 of the hinge member 68 faces the facing portion 84 but is separated therefrom in the vehicle front-rear direction.

As shown in FIG. 3, the decorative panel 60 has second fixing portions 86 on the glove box door 74 side (vehicle bottom side portions) at portions of the decorative panel 60 further to the two vehicle width direction sides than the door adjacent portion 62. The second fixing portions 86 are fixed to the top edge portion 78A of the opening section 78 by clips 88.

The glove box door 74 is positioned with respect to the decorative panel 60 on the opposite side to that of the door main body section 52A, namely is provided at a position on the vehicle bottom side, and the glove box door 74 is capable of opening towards the vehicle bottom side. Configuration is made such that when closed the glove box door 74 covers the first fixing portions 72 and the second fixing portions 86 from the front-face side of the instrument panel base member 12 (the vehicle rear side).

Note that the assembly direction towards the top edge portion 78A of the screws 80 for fixing the first fixing portions 72 to the top edge portion 78A and the assembly direction towards the top edge portion 78A of the clips 88 for fixing the second fixing portions 86 to the top edge portion 78A, and the assembly direction when attachment portions 89 of the joining section 70 shown in FIG. 4 are assembled to a support shaft portion 91 of the instrument panel base member 12, are in a matching direction, upwards towards the vehicle front side (the arrow A direction in FIG. 4).

In the instrument panel module 10, a not-illustrated control device causes gas to be fed from the inflator 42 into the airbag 44 shown in FIG. 4 when it has been detected that a frontal collision of the vehicle has actually occurred or when it has been predicted that the vehicle will be involved in a frontal collision, and the airbag 44 is accordingly inflated.

When the airbag 44 inflates the door main body section 52A of the airbag door 52 is pressed through the door reinforcement section 30, and the upper portion 62C of the door adjacent portion 62 is pressed, splitting open the vertical rupture prepared portions 54 and the vertical tearing portions 64 (see FIG. 1).

Figure 2:
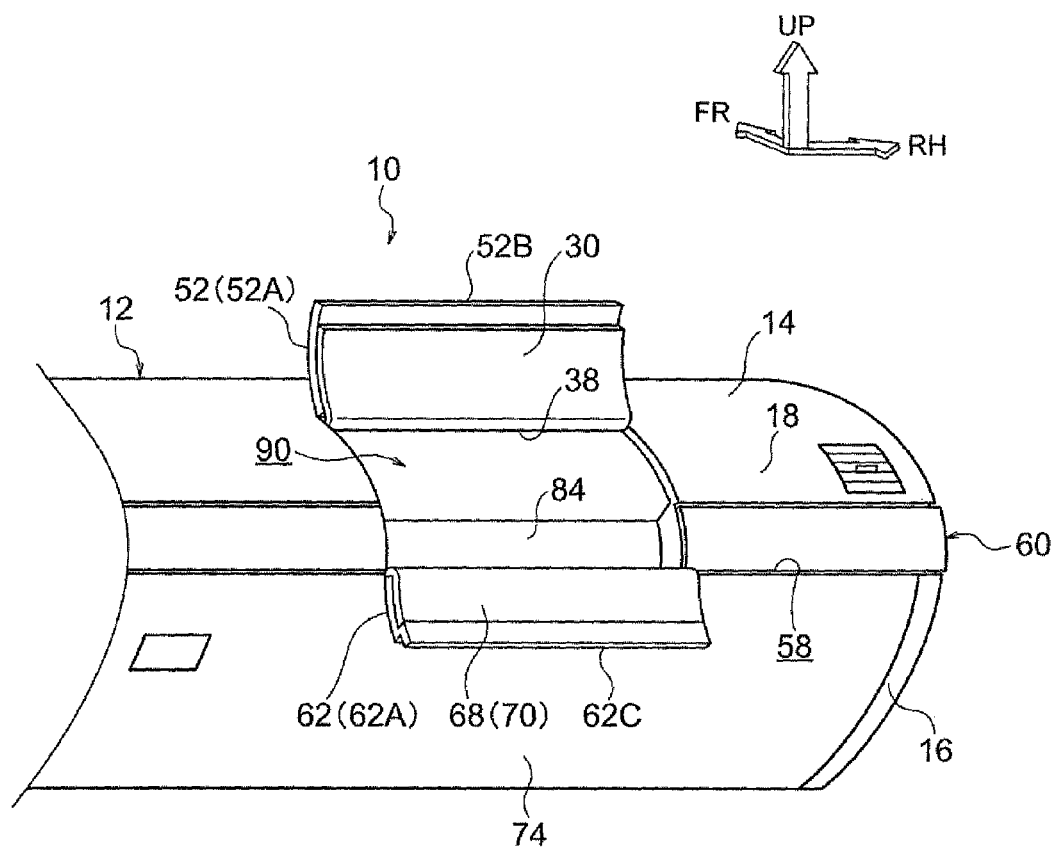
FIG. 2 is a perspective view illustrating an airbag door and a central portion of a decorative panel of the instrument panel shown in FIG. 1 in an open state.

Then, as shown in FIG. 2 and FIG. 4, the door reinforcement section 30 and the airbag door 52 open as a unit towards the vehicle top side about the hinge sections 38, 56, and the door adjacent portion 62 opens towards the vehicle bottom side about the hinge section 82. An opening section 90 is thereby formed in the top-bottom direction intermediate section 18 of the instrument panel base member 12 (see FIG. 2). The airbag 44 is accordingly inflated and deployed through the opening section 32 of the frame section 28 and the opening section 90 formed in the top-bottom direction intermediate section 18 out to the front-face side of the instrument panel base member 12.

Explanation follows regarding the operation and advantageous effect of the first exemplary embodiment of the present invention.

According to the instrument panel module 10 of the first exemplary embodiment of the present invention, as shown in FIG. 4, the door adjacent portion 62 is fixed to the instrument panel base member 12 through the hinge member 68. Therefore even when the door adjacent portion 62 opens when the airbag 44 is inflated and deployed as described above, the door adjacent portion 62, and therefore the whole of the decorative panel 60, can be suppressed from coming away, namely flying off towards the vehicle rear side, due to the decorative panel 60 being imparted with impact force from the airbag 44.

However, the main body portion 62A that is the joining portion of the door adjacent portion 62 to the hinge member 68 is positioned further towards the vehicle bottom side than the opening section 32 formed in the frame section 28 of the retainer 22. Consequently, interference can be avoided between the main body portion 62A and the airbag 44 even when the airbag 44 is inflated and deployed to the front-face side of the instrument panel base member 12 through the opening section 32. The door adjacent portion 62, and therefore the whole of the decorative panel 60, can accordingly be suppressed from coming off when the airbag 44 is inflated and deployed.

The vertical tearing portions 64 (see FIG. 1) are also respectively formed in the decorative panel 60 so as to extend along the vehicle top-bottom direction at the two vehicle width direction sides of the door adjacent portion 62. Hence, as stated above, cracks can be induced in the decorative panel 60 along the vertical tearing portions 64 when the upper portion 62C of the door adjacent portion 62 is pressed by the airbag 44. The door adjacent portion 62 can accordingly be smoothly separated from portions at its two sides, and delay in opening the door adjacent portion 62, and therefore delay in inflating and deploying the airbag 44, can be suppressed.

Since delay to inflating and deploying the airbag 44 can be suppressed in this manner, the position of the upper edge position of the decorative panel 60 can be freely set. The degrees of freedom for designing the decorative panel 60 can accordingly be increased.

In the instrument panel module 10, the airbag unit 24 is also provided between the upper section 14 and the lower section 16 of the instrument panel base member 12, in what is referred to as a mid-mounted structure. The airbag 44 can accordingly be deployed from a position closer to the front seat passenger than in what is referred to as a top-mounted airbag with an airbag unit provided to the upper section 14 of the instrument panel base member 12. The restraining ability to a front seat passenger can accordingly be enhanced.

The extension portion 52B is also formed to the airbag door 52 further to the vehicle bottom side than the door main body section 52A, and the extension portion 52B is positioned to the vehicle rear side with respect to the upper portion 62C of the door adjacent portion 62 and has an overlap in the vehicle top-bottom direction with respect to the upper portion 62C. Consequently, except for during inflation of the airbag 44, even when external force acts on the door adjacent portion 62 in the opening direction, the upper portion 62C of the door adjacent portion 62 catches on the extension portion 52B, enabling opening of the door adjacent portion 62 to be suppressed and the decorative panel 60 to be suppressed from coming off.

The extension portion 52B is also supported by the upper portion 62C of the door adjacent portion 62 even when a pressing force acts on the extension portion 52B from the front-face side of the airbag door 52. The extension portion 52B can accordingly be suppressed from being deformed by being pressed.

The joining section 70 of the hinge member 68 to the door adjacent portion 62 also faces along the vehicle front-rear direction towards the facing portion 84 formed in the instrument panel base member 12. The joining section 70 is accordingly supported by the facing portion 84 even when pressing force acts through the door adjacent portion 62 on the joining section 70 from the front-face side of the door adjacent portion 62. Deformation due to pressing the door adjacent portion 62 can accordingly be suppressed.

However, the joining section 70 is separated from the facing portion 84 in the vehicle front-rear direction. Hence even if there is some variation across the vehicle width direction in the positioning precision of the joining section 70 and/or the facing portion 84 in the vehicle front-rear direction, such variation in positioning precision can be absorbed in the gap between the joining section 70 and the facing portion 84. Precise positioning in the vehicle front-rear direction of the door adjacent portion 62 (the decorative panel 60) with respect to the airbag door 52 can accordingly be secured.

In the state in which the glove box door 74 is closed, as shown in FIG. 3, the first fixing portions 72 of the hinge member 68 to the instrument panel base member 12 and the second fixing portions 86 of the decorative panel 60 to the instrument panel base member 12 are covered by the glove box door 74 from the front-face side of the instrument panel base member 12 (see FIG. 1). Good design can accordingly be secured for the peripheral portions of the decorative panel 60 and the glove box door 74.

However, in the opened state of the glove box door 74, or in a state prior to attaching the glove box door 74 to the instrument panel base member 12, the hinge member 68 can be fixed to the instrument panel base member 12 by fixing the first fixing portions 72 to the instrument panel base member 12 using the screws 80. Similarly, the decorative panel 60 can be attached to the instrument panel base member 12 by fixing the second fixing portions 86 to the instrument panel base member 12 with the clips 88.

There is accordingly good attachment capability to the instrument panel base member 12, and few modifications are required to be made to an instrument panel module not already configured with the hinge member 68 and the decorative panel 60. Assembly of the instrument panel module 10 configured with the hinge member 68 and the decorative panel 60 can accordingly easily be made using assembly processes employed for assembling an instrument panel module not configured with the hinge member 68 and the decorative panel 60.

Furthermore, the assembly direction towards the top edge portion 78A of the screws 80 for fixing the first fixing portions 72 to the top edge portion 78A and the assembly direction towards the top edge portion 78A of the clips 88 for fixing the second fixing portions 86 to the top edge portion 78A, and the assembly direction when the attachment portions 89 of the glove box door 74 shown in FIG. 4 are assembled to the support shaft portion 91 of the instrument panel base member 12, are matching in direction, upwards towards the vehicle front side (the arrow A direction in FIG. 4). Productivity during assembling the decorative panel 60 and the hinge member 68 to the glove box door 74 and the instrument panel base member 12 can accordingly be enhanced.

Explanation follows regarding a modified example of the first exemplary embodiment of the present invention.

The first exemplary embodiment of the present invention may be configured with the airbag door 52 and the door adjacent portion 62 formed as follows. For example, in the modified example illustrated in FIG. 5, a bottom edge portion 52C of the airbag door 52 has an edge that ends at a vehicle top-bottom direction central portion of the opening section 32, such that the airbag door 52 closes off the upper moiety of the opening section 32.

Note that an upper edge portion 62D of the door adjacent portion 62 reaches the vehicle top-bottom direction central portion of the opening section 32, in a configuration in which the lower moiety of the opening section 32 is closed off by the main body portion 62A and the upper edge portion 62D.

Figure 5:
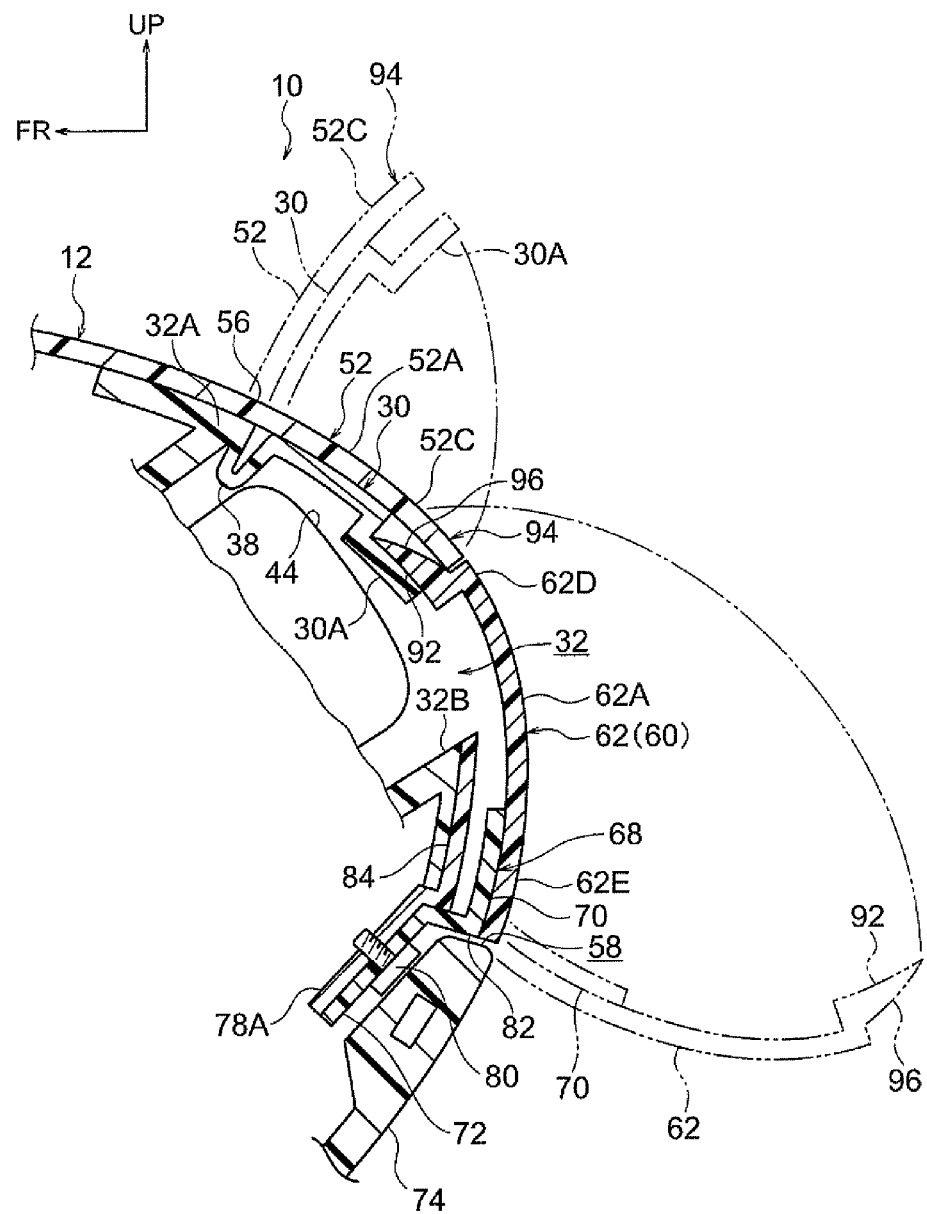
FIG. 5 is an enlarged cross-section illustrating a modified example of the airbag door, door reinforcement section and decorative panel shown in FIG. 4.

In the modified example illustrated in FIG. 5, a bottom edge portion 62E of the door adjacent portion 62 further towards the vehicle bottom side than the main body portion 62A is joined to the joining section 70 that is formed to the upper portion of the hinge member 68. The bottom edge portion 62E corresponds to the portion of the door adjacent portion on the opposite side to that of the airbag door of the present invention.

In the modified example as shown in FIG. 5, the whole of the airbag door 52 corresponds to the door main body section of the present invention, and the upper moiety portion of the opening section 32 closed off by the airbag door 52 corresponds to the first portion of the opening section of the present invention. The main body portion 62A and the upper edge portion 62D of the door adjacent portion 62 correspond to the portion of the door adjacent portion on the door main body section side of the present invention, and the lower moiety of the opening section 32 closed off by the main body portion 62A and the upper edge portion 62D of the door adjacent portion 62 corresponds to the remaining portion of the opening section of the present invention.

As shown in the modified example of FIG. 5, the following configuration is preferable when the upper edge portion 62D of the door adjacent portion 62 is positioned further to the vehicle top side than the lower portion of the opening section 32, namely when the decorative panel 60 extends to the vehicle top side.

Configuration may be made with a nipped portion 92 formed to the upper edge portion 62D of the door adjacent portion 62 and a nipping portion 94 formed to a bottom edge portion 52C of the airbag door 52. The nipped portion 92 is then nipped by the nipping portion 94 from the instrument panel base member 12 back-face side and front-face side. The nipping portion 94 is configured by the bottom edge portion 52C of the airbag door 52 and the bottom edge portion 30A of the door reinforcement section 30.

By adopting such a configuration, even if for example impact force is imparted from the instrument panel base member 12 front-face side to the airbag door 52 and the door adjacent portion 62, the bottom edge portion 52C of the airbag door 52 and the upper edge portion 62D of the door adjacent portion 62 can be suppressed from deformation towards the instrument panel base member 12 back-face side. A reaction force can accordingly be generated by the airbag door 52 and the door adjacent portion 62.

Configuration may be made with a face 96 of the nipped portion 92 positioned on the instrument panel base member 12 front-face side formed as a curved face forming a shape that is convex towards the vehicle top side. When such a configuration is adopted, even when during inflation of the airbag 44 the airbag door 52 and the door adjacent portion 62 open due to pressure from the airbag 44, the curved face of the face 96 slides smoothly against the nipping portion 94, and so the connection between the nipped portion 92 and the nipping portion 94 can be smoothly released.

The nipped portion 92 may also be formed such that its thickness reduces in thickness on progression towards its leading end. Such a configuration enables the nipped portion 92 to be easily connected (inserted into) to the nipping portion 94 during decorative panel 60 assembly.

Configuration may be made with the nipped portion 92 formed to the bottom edge portion 52C of the airbag door 52, and the nipping portion 94 formed to the upper portion 62C of the door adjacent portion 62. The upper edge portion 62D of the door adjacent portion 62 and the bottom edge portion 52C of the airbag door 52 that are formed with the nipped portion 92 and the nipping portion 94 correspond to the end portions on the respective sides of the door main body section and the door adjacent portion in such a case.

Figure 6:
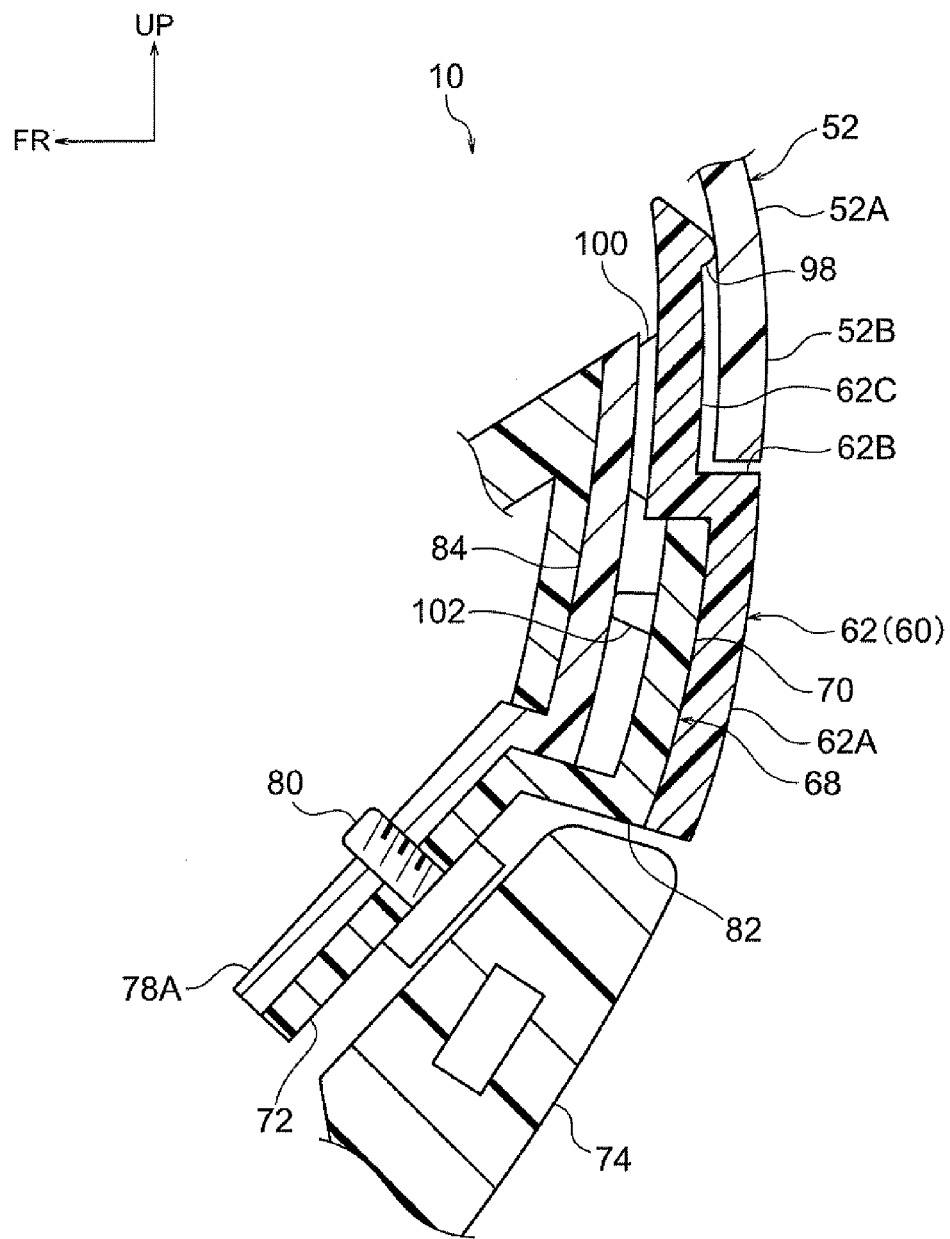
FIG. 6 is an enlarged cross-section illustrating another modified example of the decorative panel and hinge member shown in FIG. 4.

Configuration may be made, as in a modified example illustrated in FIG. 6, with a projection portion 98 for making contact with the airbag door 52 and a rib 100 for making contact with the facing portion 84 formed to the upper portion 62C of the door adjacent portion 62. Configuration may also be made with a projection portion 102 for making contact with the facing portion 84 formed to the joining section 70 of the hinge member 68.

Rattling of the airbag door 52 and the door adjacent portion 62 can be suppressed by adopting such configurations.

In the first exemplary embodiment of the present invention, as shown in FIG. 3, the first fixing portions 72 are fixed to the top edge portion 78A of the opening section 78 of the glove box 76 using the screws 80; however, clips may be employed in place of the screws 80.

However, whereas the second fixing portions 86 are fixed to the top edge portion 78A by the clips 88, screws may be employed in place of the clips 88. Furthermore, either screws or clips may be employed for both fixing the first fixing portions 72 to the top edge portion 78A and for fixing the second fixing portions 86 to the top edge portion 78A.

The front passenger seat airbag device 20 is a mid-mounted airbag provided to the up-down direction intermediate section 18 of the instrument panel base member 12. However, the front passenger seat airbag device 20 may be configured as a top-mounted airbag provided to the upper section 14 of the instrument panel base member 12.

When, for example, the front passenger seat airbag device 20 is a top-mounted airbag, the airbag door 52 and the decorative panel 60 may be disposed in a reverse arrangement to that described above. Namely, the decorative panel 60 may be disposed at the vehicle top side of the airbag door 52 so as to open to the vehicle top side, and the airbag door 52 may open towards the vehicle bottom side.

Any combinable combination from the plural modified examples above may be combined and implemented as appropriate.

Whereas the present invention has been explained by way of the first exemplary embodiment above, the present invention is not limited thereto and various other modifications may be implemented within a range not departing from the spirit of the present invention.

The invention claimed is:
1. An instrument panel module, comprising:
   an instrument panel base member provided at a front section of a vehicle compartment;
   a retainer that is joined to a back-face side of the instrument panel base member and that comprises a frame section formed with an opening section that opens towards a front-face side of the instrument panel base member;
   an airbag unit comprising an airbag that is housed in a folded state inside the frame section and that inflates and deploys to the front-face side of the instrument panel base member when supplied with gas;
   an airbag door formed at the instrument panel base member, comprising a door main body section that closes off a first portion of the opening section and that is capable of opening either to a vehicle top side or a vehicle bottom side;
   a decorative panel comprising a door adjacent portion that is adjacent to the door main body section in a vehicle top-bottom direction, a portion of the door adjacent portion at a door main body section side closing off a remaining portion of the opening section, and a portion of the door adjacent portion at an opposite side to the door main body section being positioned further toward the opposite side to the door main body section than the opening section; and
   a hinge member that is joined to the portion of the door adjacent portion at the opposite side to the door main body section, that is fixed to the instrument panel base member, and that supports the door adjacent portion so as to enable the door adjacent portion to open in an opposite direction to an opening direction of the airbag door.

2. The instrument panel module of claim 1, wherein:
   the hinge member comprises a fixing portion that is fixed to the instrument panel base member by a screw or a clip at a portion of the hinge member at an opposite side thereof to the door main body section; and
   the instrument panel module further comprises a glove box door provided, so as to be capable of opening, at a position at the opposite side of the decorative panel to the door main body section, with the glove box door covering the fixing portion from the instrument panel base member front-face side when the glove box door is closed.

3. The instrument panel module of claim 2, wherein:
   the hinge member comprises a first fixing portion as the fixing portion;
   the decorative panel comprises second fixing portions disposed at portions further toward both vehicle width direction sides than the door adjacent portion, the second fixing portions being fixed to the instrument panel base member at portions of the decorative panel at a glove box door side by screws or clips; and
   the glove box door is configured so as to cover the first fixing portion and the second fixing portions from the instrument panel base member front-face side when the glove box door is closed.

4. The instrument panel module of claim 3, wherein an assembly direction of the screws or clips fixing the first fixing portion and the second fixing portions to the instrument panel base member, and an assembly direction of the glove box door to the instrument panel base member are matching directions.

5. The instrument panel module of claim 1, wherein the decorative panel is formed with vertical tear line portions that extend along the vehicle top-bottom direction at both the vehicle width direction sides of the door adjacent portion.

6. The instrument panel module of claim 1, wherein an extension portion is formed at the airbag door further toward a door adjacent portion side than the door main body section, and the extension portion is positioned at a vehicle rear side with respect to the portion of the door adjacent portion at the door main body section side and overlapping, in the vehicle top-bottom direction, the portion of the door adjacent portion at the door main body section side.

7. The instrument panel module of claim 1, wherein a facing portion is formed at the instrument panel base member, and the facing portion faces, in a vehicle front-rear direction, a joining portion of the hinge member to the door adjacent portion.

8. The instrument panel module of claim 7, wherein the joining portion is separated from the facing portion in the vehicle front-rear direction.

9. The instrument panel module of claim 1, wherein:
- a nipped portion is formed at one end portion of adjacent ends of the door main body section or the door adjacent portion; and
- a nipping portion is formed at the other end portion of the adjacent ends of the door main body section or the door adjacent portion, and the nipping portion nips the nipped portion from the instrument panel base member front-face side and back-face side.

10. The instrument panel module of claim 9, wherein a face of the nipped portion positioned at the instrument panel base member front-face side is a curved face forming a shape that is convex towards the vehicle top side.

11. The instrument panel module of claim 10, wherein the nipped portion is formed so as to become thinner towards a leading end thereof.

12. The instrument panel module of claim 1, wherein:
- the retainer is disposed at a portion in front of a front passenger seat; and
- the opening section is positioned between an upper portion of the instrument panel base member and the glove box door that is provided at a lower portion of the instrument panel base member.

\* \* \* \* \*